March 11, 1952     R. G. HOLMES     2,588,926
TEMPERATURE RESPONSIVE CONTROL CIRCUIT
Filed Feb. 1, 1951
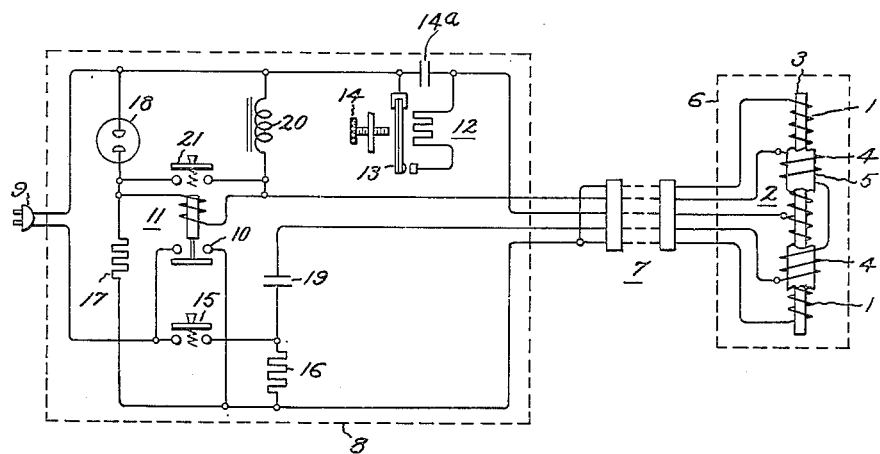
Inventor:
Robert G. Holmes,
by   *Sheridan W. Begg*
His Attorney.

Patented Mar. 11, 1952

2,588,926

UNITED STATES PATENT OFFICE 2,588,926

TEMPERATURE RESPONSIVE CONTROL
CIRCUIT

Robert G. Holmes, Bridgeport, Conn., assignor to General Electric Company, a corporation of New York Application February 1, 1951, Serial No. 208,965

3 Claims. (Cl. 219—20)

This invention relates to temperature responsive control circuits and more particularly to those circuits for controlling the heating in electric blankets and like electric heating devices.

This invention is closely related to the patent of George C. Crowley, No. 2,565,478, entitled "Temperature Responsive Control Circuit," patented August 28, 1951, and assigned to the same assignee as the present invention. In his abovementioned patent, Crowley discloses certain definite control circuits which provide over-temperature protection by the use of the temperature sensitive structure disclosed in the patent of Spooner et al., No. 2,581,212, patented January 1, 1952, for an "Electric Heated Fabric," and assigned to the same assignee as the present invention. This present invention also uses the temperature sensitive structure of Spooner et al. for over-temperature protection purposes but provides a new and improved control circuit for doing so.

The circuit of Crowley involves the employment of two identical resistors connected across the voltage source for use as a voltage divider. Although these resistors give satisfactory results for that purpose, they include some disadvantages when the circuit is viewed as a whole. Perhaps the most serious disadvantage is that these resistors help cause preheating of the load, which is usually an electric blanket. By preheating it is meant the tendency of the control to cause the blanket to initially heat to a higher temperature than its steady state temperature. The result is that the user may feel too warm during the initial heating period and reset the control for a lower temperature and fall asleep. After the initial preheating has terminated, the control will lower the temperature to the reset lower value and the user may be awakened by the depressed temperature. This, of course, is exceedingly annoying to the user.

The temperature regulation of the blanket in Crowley's control circuit is accomplished by a cycling control, such as is described and claimed in the U. S. patent to William K. Kearsley, No. 2,195,958, April 2, 1940. A bimetallic element, actuated primarily by a closely adjacent heater, opens and closes the contacts of the cycling control. This heater, which may be in series or in parallel with the load, is energized along with the load circuit by the cycling control. In addition to heat delivered from the heater, heat is also supplied to the bimetallic element from the aforementioned resistors used as voltage dividers, which, for reasons of cost, simplicity, and appearance, are contained in the same case as the cycling control, although more remotely located than the heater. By considering the amount of heat given off by these voltage divider resistors, as well as the amount dissipated by the heater, the control can be designed to give excellent steady state results. However, the voltage divider resistors are of high ohmic value as compared to the heater of the cycling control, and, for that reason, are slow to heat as compared to the heater. Moreover, since in most commercial applications the voltage divider resistors are more remotely located from the bimetallic element than the heater, the bimetal is not materially influenced by heat dissipated from the voltage dividers during the initial cycles of operation. Therefore, when the control is first activated, the heater must heat beyond its normal steady state value in order to cause the bimetallic element to open the contacts of the cycling control. Since the load, usually a blanket, is operated concurrently with the heater by the cycling control contacts, it too will heat beyond its eventual steady state value. This preheating of the blanket is, of course, objectionable.

Therefore, it is an object of this invention to provide for use with electric blankets and like heating devices a new and improved control circuit which essentially eliminates preheating of the load.

Another object of this invention is the provision of a control unit in which the over-temperature protection control circuit and operating condition indicating circuit are combined with a resultant reduction in the number of parts required and in which the operation of the control is actually improved by eliminating the annoying preheating described in the foregoing.

This invention combines the over-temperature protection control and operating condition indicating circuits of prior art into a single improved circuit. In the improved circuit, the voltage divider resistors of the prior control circuit are eliminated, and a neon glow lamp and an associated resistor are used as the voltage dividers, as well as for operation condition indicating purposes. The voltage regulating characteristic of the neon lamps, i. e., the characteristic of passing additional current with a little or no rise in voltage once it has fired, makes it particularly applicable for this use as a voltage divider.

For a better and more complete understanding of this invention, together with additional objects and advantages thereof, reference should now be had to the following description and the accompanying drawing which is a schematic diagram of a control circuit embodying this invention.

Referring to the diagram, the inner resistor 1 of a combined heating and thermo-sensitive element 2 is wound on a flexible core or strand 3 formed of Fiberglas, stranded cellulose acetate, or other suitable flexible insulation. The inner resistor 1 is separated from an outer signal wire 4 by a thin layer 5 of one of the organic materials disclosed in the aforementioned Spooner et al. application, Serial No. 91,396, nylon being preferable. The thin layer 5 is essentially an insulator at normal operation temperatures of the element 2 and at predetermined higher temperatures is a conductor of electricity. The combined heating and thermo-sensitive element 2 may be arranged inside a blanket 6 in a series of convolutions or in other patterns and may be run in passages provided for it as described in U. S. Patent No. 2,203,918, issued July 11, 1940, to I. O. Moberg. Element 2 is joined through a multi-terminal plug and socket 7 to a control circuit which is housed in a control box 8. Means for connecting the control circuit to a source of power, for example, the conventional 115 volts, 60 cycles, A.-C. domestic circuit, is provided by plug 9.

The load or blanket heating circuit consists of the inner resistor 1 of element 2, which, for example, may be divided into two sections connected in parallel, the parallel connection here having a resistance of the order of 60 ohms. This heating circuit is connected to one side of the line through the normally open contacts 10 of a control device such as electromagnetic relay 11 and to the other side of the line through a cycling control 12, responsive to room temperature, of the type described and claimed in the hereinbefore mentioned Kearsley Patent No. 2,195,958, April 2, 1940. The cycling control 12 includes a bimetallic switch 13 having an external adjustment knob 14. A condenser 14a is connected across the switch contacts for reducing arcing between them. A combination of a normally open, manually operated switch 15 and a 6,800 ohm resistor 16 connected serially is connected in parallel with contact 10.

A control circuit in the form of an impedance bridge having a series resonant circuit comprising two legs and a 200,000 ohm resistor 17 and a neon glow lamp 18 connected serially comprising the other two legs is connected across the source in series with contacts 10 but by-passing control 12. The series resonant circuit forming two legs of the bridge is comprised of a 0.1 mfd. capacitor 19 connected serially to a 75 henry choke coil 20 by the outer signal wire 4 of the thermo-sensitive element 2, the resistance of signal wire 4 being preferably about 400 ohms. Choke 20 is connected directly to one side of the source, but capacitor 19 is connected to the junction of switch 15 and resistor 16. A normally open, manually operated switch 21 and the operating coil of relay 11 are connected in parallel across opposite terminals of the aforementioned impedance bridge, namely being connected between the junction of resistor 17 and neon glow lamp 18 and the junction of choke 20 and signal wire 4. The coil impedance of relay 11 should be of the order of 90,000 ohms with the relay armature closed. With a 115, 60 cycle A.-C. volt source, the voltage available at the coil of relay 11 will be approximately 130 volts, due to the resonant effect of choke 20 and capacitor 19. Relay 11 will pull in at somewhere below that value, but will drop out at about 75 volts.

To energize the circuit assuming the thermostatic control device 12 to be calling for heat, switch 15 is closed thereby energizing the resonant circuit of capacitor 19, conductor 4 and choke 20. The voltage then available at the coil of relay 11 is of the magnitude mentioned above, and relay 11 operates closing contact 10. This closes the operating circuit for the heater wire 1, and the blanket begins to warm up. Switch 15, of course, is released as soon as relay 11 operates. This places resistor 16 in the resonant circuit and limits the current therein during normal operation.

The fact that the circuit is in operation is indicated by the neon glow lamp 18. Besides this indicating function, glow lamp 18 and its series resistor 17 also perform another extremely important function in the circuit, that of acting as voltage dividers so that if an appreciable current path forms between the heater resistor 1 and signal wire 4, the voltage at the terminals of the coil of relay 11 drops to about half the line voltage. This lets relay 11 drop out, thereby opening contacts 10 and clearing the circuit.

However, assuming the circuit to be in good working order, once contact 10 closes, the heating circuit will remain in operation dependent upon the cycling of the control device 12. The entire circuit is de-energized, i. e., blanket 6 turned off by the closing of switch 21. Switch 21, when closed, shorts the coil of relay 11 and causes the relay coil voltage to drop to substantially zero. This de-energizes relay 11 so that it drops out, opening contacts 10 and clearing the circuit.

The circuit may be de-energized automatically, as mentioned above, when the blanket overheats to a cut-off temperature, for example, when it heats over an external temperature of 225 degrees F. which represents a temperature of about 250 degrees F. in nylon control layer 5. A rise in temperature of control layer 5 over this cut-off value causes the resistance of nylon control layer 5 to drop sufficiently in value that it passes appreciable current from resistor 1 to signal wire 4. This forms parallel circuits around capacitor 19 and choke 20 which disturb the resonance of the resonant circuit, thereby causing the voltage across choke 20 to drop appreciably. Since the voltage across neon flow lamp 18 does not change, the drop in voltage across choke 20 causes the voltage across the coil of relay 11 to fall off sufficiently to cause relay 11 to drop out and clear the circuit.

Once nylon control layer 5 has cooled, blanket 8 may again be placed in service by momentarily closing switch 15. Holding switch 15 closed before the control layer cools does not harm blanket 6 because with switch 15 closed resistor 16 is in series with the load and limits the current to a low value. Moreover, the failure of any circuit component causes the circuit to fail safe by impairing the resonance of the resonant circuit and causing relay 11 to drop out.

As previously mentioned, the preheating effect caused by the blanket control circuits of prior art is essentially eliminated by the circuit of this invention. Although a very small amount of undesired heat is liberated by resistors 16 and 17, choke 20 and relay 11, it is so slight that it does not appreciably affect the operation of the cycling control.

Related patent applications assigned to applicant's assignee other than those previously referred to herein are McNairy, Serial No. 134,002, filed December 20, 1949; Crowley, Serial No. 220,440, filed April 11, 1951; and Crowley et al., Serial No. 236,208, filed July 11, 1951.

Although the circuit produces satisfactory results using the values stated for the various circuit components, these values are meant to be merely illustrative. Numerous modifications and alterations may be made by those skilled in the art without actually departing from the invention, and I therefore aim in the appended claims to cover all such equivalent variations as fall within the true spirit and scope of this invention.

What I claim as new and desire to secure by Letters Patent of the United States is:

1. In a control circuit including a control impedance comprising a heater resistor and a signal wire having between them a thin layer of material which is substantially an insulator at one temperature and at a predetermined higher temperature a conductor of electricity of conventional domestic voltage and frequency which forms a current path between said resistor and said signal wire, a pair of supply terminals, an impedance bridge connected across said terminals, two legs of said bridge collectively comprising a resistor and a neon glow lamp serially connected and the other two legs collectively comprising in serial relationship reactance means, said signal wire and a capacitor, a control relay having an operating coil and contacts biased to the open position, means connecting said operating coil across opposite terminals of said impedance bridge to derive voltage therefrom to operate said contacts to the closed position, and means including said contacts and for providing a circuit connecting said resistor across said supply terminals in parallel to said bridge circuit, whereby the current path formed through said thin layer of material between said signal wire and said heater resistor upon the attainment of conducting status of said layer completes parallel circuits about two legs of said impedance bridge effective to reduce the magnitude of energization of said operating coil to allow said contacts to return to said open position.

2. In a control circuit including a control impedance comprising a heater resistor and a signal wire having between them a thin layer of material which is substantially an insulator at one temperature and at a predetermined higher temperature a conductor of electricity of conventional domestic voltage and frequency which forms a current path between said resistor and said signal wire, a pair of supply terminals, a control relay having an operating coil and contacts biased to the open position, an impedance bridge connected in series with said contacts across said supply terminals, two legs of said bridge collectively comprising a resistor and a neon glow lamp serially connected and the other two legs collectively comprising in serial relationship reactance means, said signal wire, a current limiting resistor and a capacitor serially connected, means connecting said operating coil across opposite terminals of said impedance bridge to derive voltage therefrom to operate said contacts to the closed position, a thermo-sensitive cycling control having cycling contacts, and a heating circuit serially connecting the contacts of said control relay, said cycling contacts and said heater resistor across said supply terminals in parallel to said bridge whereby the current path formed through said thin layer of material between said signal wire and said heater resistor upon the attainment of conducting status of said layer completes parallel circuits about two legs of said impedance bridge effective to reduce the magnitude of energization of said operating coil to allow said contacts to return to said position.

3. In a control circuit including a control impedance comprising a heater resistor and a signal wire having between them a thin layer of material which is substantially an insulator at one temperature and at a predetermined higher temperature a conductor of electricity of conventional domestic voltage and frequency which forms a current path between said resistor and said signal wire, a pair of supply terminals, a control relay having an operating coil and contacts biased to the open position, an impedance bridge connected in series with said contacts across said source of power, two legs of said bridge collectively comprising a resistor and a neon glow lamp serially connected and the other two legs collectively comprising in serial relationship reactance means, said signal wire, a current limiting resistor and a capacitor serially connected, means connecting said operating coil across opposite terminals of said impedance bridge to derive voltage therefrom to operate said contacts to the closed position, a pair of manually operated switches having contacts biased to the open position and respectively connected across said operating coil and in parallel relationship with the contacts of said control relay, a thermo-sensitive cycling control having cycling contacts, and a heating circuit serially connecting the contacts of said control relay, said cycling contacts and said heater resistor across said supply terminals in parallel with said bridge whereby the current path formed through said thin layer of material between said signal wire and said heater resistor upon the attainment of conducting status of said layer completes parallel circuits about two legs of said impedance bridge effective to reduce the magnitude of energization of said operating coil to allow said contacts to return to said open position.

ROBERT G. HOLMES.

REFERENCES CITED

The following references are of record in the file of this patent:

UNITED STATES PATENTS

| Number | Name | Date |
| --- | --- | --- |
| 2,334,530 | Andrews | Nov. 16, 1943 |
| 2,413,125 | Walbridge | Dec. 24, 1946 |
| 2,446,810 | Cook | Aug. 10, 1948 |
| 2,467,856 | Rich | Apr. 19, 1949 |
| 2,479,319 | Crowley et al. | Aug. 16, 1949 |
| 2,565,478 | Crowley | Aug. 28, 1951 |
| 2,581,212 | Spooner et al. | Jan. 1, 1952 |

FOREIGN PATENTS

| Number | Country | Date |
| --- | --- | --- |
| 338,880 | Great Britain | Nov. 18, 1930 |